United States Patent [19]

Shiota

[11] Patent Number: 5,124,743
[45] Date of Patent: Jun. 23, 1992

[54] PHOTOGRAPHIC PRINTER WITH APPARATUS FOR STRAIGHTENING CURL OF DEVELOPED PHOTOGRAPHIC FILM

[75] Inventor: Kazuo Shiota, Kanagawa, Japan

[73] Assignee: Fuji Photo Film Co., Ltd., Kanagawa, Japan

[21] Appl. No.: 757,757

[22] Filed: Sep. 11, 1991

[30] Foreign Application Priority Data

Sep. 12, 1990 [JP] Japan .................................. 2-242253

[51] Int. Cl.$^5$ .............................................. G03B 27/52
[52] U.S. Cl. .......................................... 355/30; 355/50
[58] Field of Search ............... 355/27, 30, 50, 100, 355/110; 432/59

[56] References Cited

U.S. PATENT DOCUMENTS 3,817,618  6/1974  Riley et al. ............................ 355/100
4,209,251  6/1980  Schroeder et al. .................. 355/110

FOREIGN PATENT DOCUMENTS 62-103625  5/1987  Japan .
62-208028  9/1987  Japan .
 1-28948   11/1989  Japan .
 1-279231  11/1989  Japan .
 1-279250  11/1989  Japan .
  2-2519    1/1990  Japan .

Primary Examiner—Richard A. Wintercorn
Attorney, Agent, or Firm—Sughrue, Mion, Zinn, Macpeak & Seas

[57] ABSTRACT

The leader of a developed photographic film advanced from a cassette is transported to a curl quantity measuring unit. The curl quantity measuring unit measures, as the curl quantity, a height of the end of the film leader maintained free. In accordance with the obtained curl quantity, the temperature and heating time of a heating roller are controlled to straighten the curl. The developed photographic film with the curl straightened is transported to a print station at which an image within a frame to be printed is projected to a color paper while pushing the peripheral portion of the frame.

12 Claims, 3 Drawing Sheets

PHOTOGRAPHIC PRINTER WITH APPARATUS FOR STRAIGHTENING CURL OF DEVELOPED PHOTOGRAPHIC FILM

BACKGROUND OF THE INVENTION

The present invention relates to a photographic printer and more particularly to an apparatus for straightening the curl of a developed photographic film contained within a cassette in the form of roll before printing the film.

Recently, there have been proposals to record photographing information, print instruction information, user identification information, or the like on a recording medium such as a transparent magnetic recording layer formed in a photographic film, e.g., negative film, a magnetic recording sheet attached to a cassette containing an unexposed negative film, and a memory IC built in a cassette (see Japanese Patent Laid-open Publications Nos. 62-103625, 62-208028, 1-279231, and 1-289948). Various information recorded on such a recording medium is read by a photographic printer or the like to use it for exposure control or the like.

Conventionally, in a laboratory a negative film roll is cut into a plurality of negative film pieces having four to six frames each. Each negative film piece is contained within the pocket of a film sheath for return to a user. If the above-mentioned typed information had been recorded on a cassette in some manner, it would be necessary for a user to take custody of an empty cassette as well as the film sheaths containing the negative film pieces. If the cassette were lost, information recorded on the cassette could not be used to perform extra printing, for example, to make additional photoprints, or for other purposes. If such information was recorded on a transparent magnetic recording layer of a negative film, such a problem will not arise, but the information that could be recorded that way would be restricted. For example, although it is convenient if information common to all frames is recorded on the film leader, such common information preferably should be recorded on the transparent magnetic recording layer of each frame, taking into consideration that the negative film may be cut into negative film pieces The above problem can be solved by winding a developed negative film within a cassette without cutting it into negative film pieces. Using an empty cassette as a container of a developed negative film is disclosed in Japanese Patent Laid-open Publications Nos. 1-279250 and 2-9519.

In order to reduce the amount of space necessary to contain a developed negative film, it is effective to wind the negative film on a small diameter spool. An ordinary negative film using triacetyl cellulose (TAC) as a base has a strong tendency to curl when wound in a coil. If a negative film having a curl is printed, there is a fear of lowering the print quality. Currently, there exists a well known practice of placing a negative film between two glass plates to remove any curl the film may have. This method, however, is associated with problems in which Newton's rings are likely to be produced, dust is likely to attach, frame adjustment is difficult, and the like.

SUMMARY OF THE INVENTION

It is therefore a principal object of the present invention to provide an apparatus that will easily straighten the curl of a photographic film which results when the film is wound in a coil.

It is another object of the present invention to provide an apparatus that will straighten the curl in accordance with the degree of curl present and without creating an opposite curl.

The above and other objects can be achieved by measuring the quantity of curl of a photographic film, and controlling curl straightening apparatus in accordance with the measured curl quantity. The curl straightening apparatus is constituted by a heat roller whose temperature and heating time are controlled in accordance with the curl quantity. The heat roller is positioned on the film passageway between cassette holding apparatus and a print station.

According to the present invention, a photographic film is straightened by controlling parameters of the curl straightening apparatus (such as heating value, pressure value, time, humidity, and the like) in accordance with the curl quantity. The present invention poses no problems such as Newton's rings, dust attachment, and the like which are caused by a conventional method in which a photographic film is sandwiched between two glass plates. Thus, the photographic printer of the present invention can improve print quality, and can straighten automatically and continuously the curl of a plurality of photographic films.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT

Figure 2:
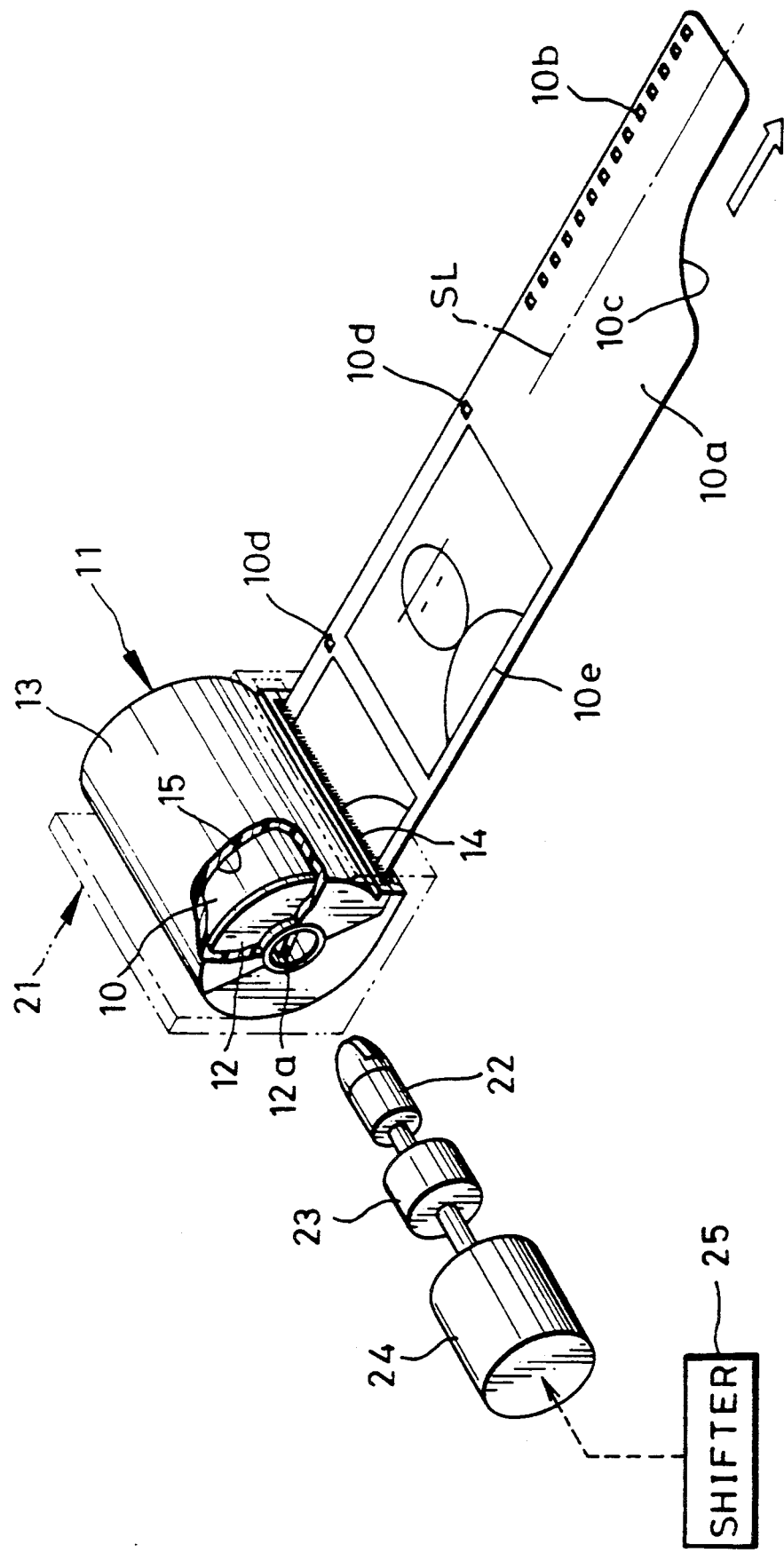
FIG. 2 is a perspective view of a cassette held in position by a cassette holder.

Referring to FIG. 2, a developed photographic film, e.g., a negative film 10, is coiled on a spool 12 and contained within a cassette 11. This cassette 11 is constructed of the spool 12, and a cassette shell 13 containing the spool 12. The cassette 11 is provided with a self film advance function. As the spool 12 is rotated in the film advance (unwinding) direction, the leader 10a of the negative film 10 is advanced out of the cassette 11 via a film passage slit 14. With the self film advance function, a negative film roll is rotated with the spool 12 by clamping the roll of the negative film 10 with flanges of the spool 12, or by pushing the outermost turn of the negative film roll with ridges mounted within the cassette shell 13.

A cut-off portion 10c is provided in the film leader 10a to reduce the resistance of feeding the film leader 10a by rotating the spool 12. A plurality of perforations 10b, formed in the film leader 10a, are used for film advance. A positioning perforation 10d is formed in each frame 10e. This positioning perforation 10d is mechanically or optically detected to set each frame 10e correctly within the exposure aperture of a camera.

The negative film 10 is wound on the spool 12 with its photosensitive emulsion layer facing inside. A transparent magnetic recording layer is formed over the whole surface opposite the photosensitive emulsion layer. On the magnetic recording layer, there are magnetically recorded film information, photographing information, print instruction information and the like, respectively at the time of manufacturing the film and at the time of photographing.

Figure 1:
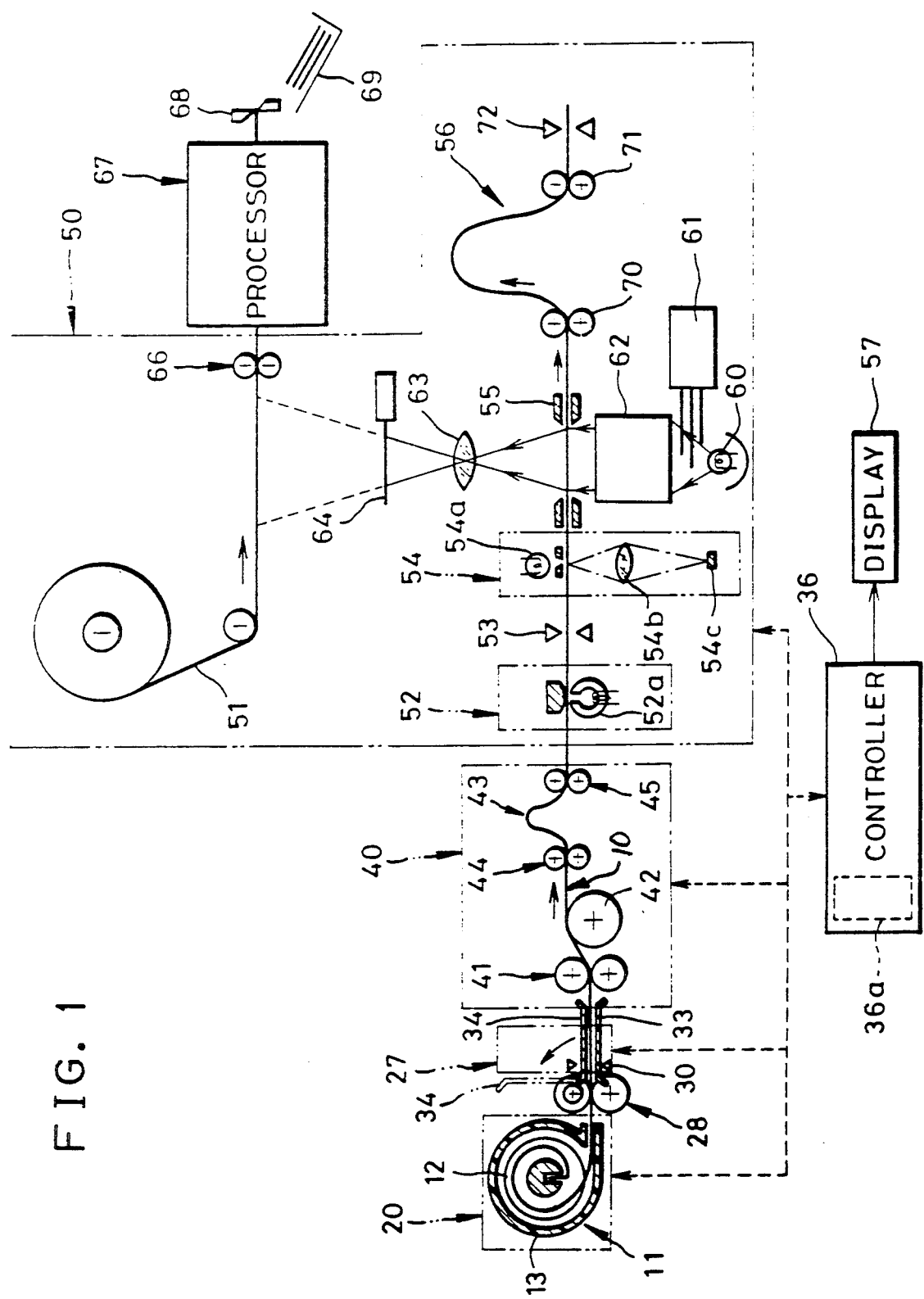
FIG. 1 is a schematic diagram showing a printer processor equipped with a film curl straightening apparatus according to the present invention.

As shown in FIG. 1, the cassette 11 is set in a cassette loading section 20 of the printer processor. As shown in FIG. 2, the cassette loading section 20 from FIG. 1 has a cassette holder 21 and a spool rotating shaft 22. The cassette holder 21 is formed with a recess for receiving the cassette 11 in such a manner that, while the spool 12 is rotated in the film advance direction by the spool rotating shaft 22, the cassette 11 is held in position without being rotated. The spool rotating shaft 22 is coupled to a motor 24 via a torque limiter 23. The spool rotating shaft 22 is moved by a shifter 25 between an engagement position where the distal end of the spool rotating shaft 22 is fitted in an engagement recess 12a of the spool 12, and a retracted position.

Figure 3:
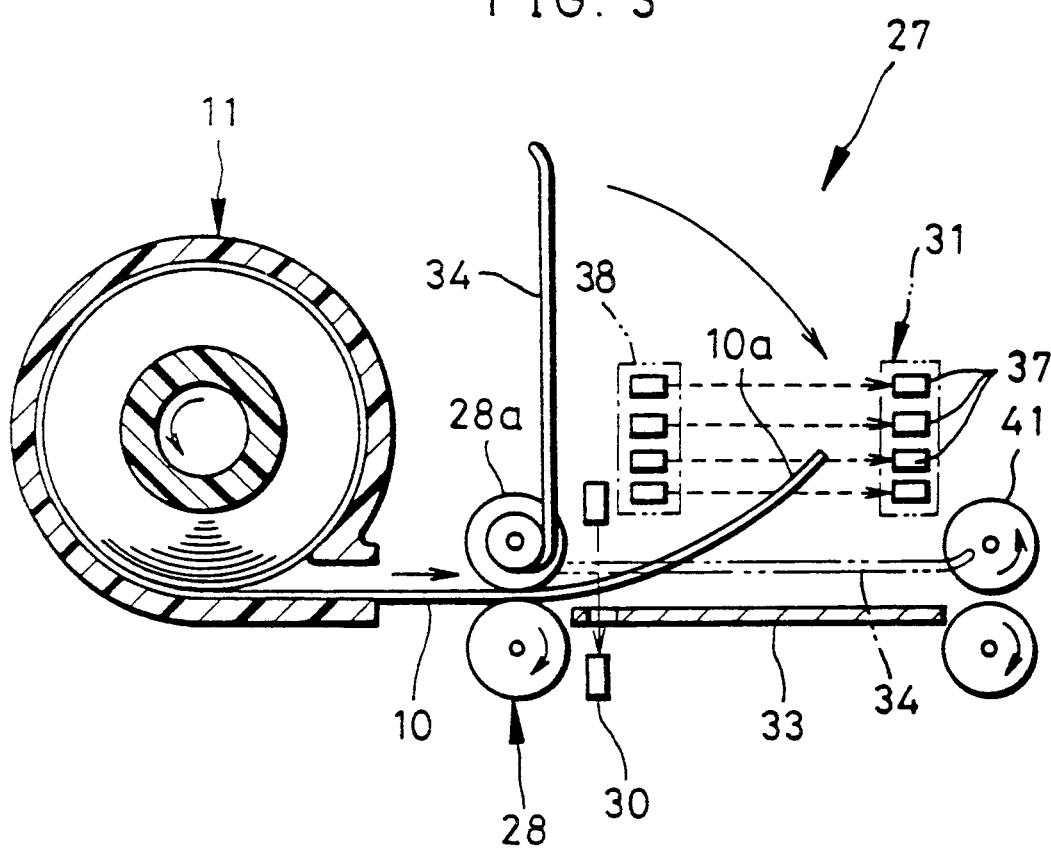
FIG. 3 is a schematic diagram showing a curl quantity measuring unit.

In FIG. 3, a curl quantity measuring unit 27, for measuring the curl quantity of the film leader 10a, is provided in front of the cassette loading section 20 of FIG. 1. At the curl quantity measuring unit 27, there are a film pulling roller pair 28, a film edge sensor 30, and a sensor unit 31. A fixed guide plate 33 and movable guide plate 34 are disposed on the side of the film pulling roller pair 28 opposite the cassette 11. The movable guide plate 34 is mounted rotatably and coaxially with the upper roller 28a of the film pulling roller pair 28. The movable guide plate 34 is retracted upwardly to a vertical position when the curl quantity is measured, and becomes horizontal after curl measurement so as to guide the film leader 10a to a film feed roller pair 41 of the curl straightening unit 40 which is found in FIG. 1.

The film end sensor 30 is constructed of a light projecting/receiving type optical sensor. The film end sensor 30 detects the end of the film leader 10a pulled out of the film pulling roller pair 28, and sends a detection signal to a controller 36 which is found in FIG. 1. The sensor unit 31 is constructed of a plurality of photosensors 37 disposed vertically at equal intervals. The sensor unit 31 detects the vertical position of the end of the film leader 10a when the film leader 10a is pulled out of the film pulling roller pair 28 by a predetermined amount. This film end position signal is sent to the controller 36. The film end sensor 30 and sensor unit 31 are disposed so as to measure a line SL shown in FIG. 2. A projector unit 38 is constructed of a plurality of light sources. A line image sensor may be used as the sensor unit 31.

Referring to FIG. 1, the controller 36 is constructed of a microcomputer to control various elements of the apparatus. The controller 36 controls the curl straightening unit 40 by measuring the curl quantity of the negative film 10 in accordance with the film end position signal from the sensor unit 31 shown in FIG. 3, and straightening the curl most properly for the measured curl quantity. The curl straightening unit 40 is constructed of a film feed roller pair 41, a heating roller 42, and a film reservoir 43. The heating roller 42 rotates in contact with the outer surface of the curl on the negative film 10. The temperature of the heating roller 42 is controlled by the controller 36.

The film reservoir 43 is constructed of two pairs of film feed rollers 44 and 45. In accordance with a difference between the film feed speeds of the roller pairs 44 and 45, the negative film 10 is stored or reserved between the roller pairs in the form of a loop. This stored film portion is used for adjusting the film contact time with the heating roller 42. If the curl quantity is large, the amount of heat supplied by the heating roller 42 is increased, and the film feed speed is decreased so as to increase the film contact time with the heating roller 42. If the curl quantity is small, the film feed speed is increased. The relation between the curl quantity of the film leader 10a and the heat amount and the contact time of the heating roller 42 is obtained in advance through experiments or the like for each type of a negative film, and is stored as look-up-table data in a ROM 36a of the controller 36. The types of a negative film 10 are classified in accordance with the type of base (TAC, PET, etc.), base thickness, photosensitive emulsion layer structure, back layer structure, and the like. The curl straightening control quantity is determined in accordance with this classification.

The printer 50 transports the negative film 10 with the curl straightened to the print station to print each frame of the negative film 10 on a color paper 51. In the printer 50, an information reading unit 52, a perforation sensor 53, a photometry scanner 54, a film carrier 55, and a film reservoir 56, are disposed in that order from the film inlet.

The information reading unit 52 has a read head 52a for reading information recorded for each track of the transparent magnetic recording layer of the negative film 10, and for sending the read information to the controller 36. The controller 36 displays the read information on a display 57, the displayed contents being used in determining a print exposure amount and in forming a pseudo zoom photoprint. A pseudo zoom photoprint is obtained by enlarging a principal object included in an image frame recorded on a negative film exposed in a camera with a standard lens so that it is similar to a photoprint which would be obtained from an image frame recorded by use of a zoom lens.

The perforation sensor 53 optically detects the positioning perforation 10d of each frame. This perforation detection signal is sent to the controller 36. In accordance with the perforation detection signal, the controller 36 sets the frame to be printed to the print station of the film carrier 55.

The photometry scanner 54 is constructed of a lamp 54a, a lens 54b, and a line sensor 54c. The photometry scanner 54 scans the frame image to be printed in the direction the film is advancing, so as to conduct three color separation photometry for each point within the frame. The photometric signal is sent to a characteristic value calculation unit of the controller 36 to calculate characteristic values necessary for determining the print exposure amount. An exposure amount calculation unit of the controller 36 calculates an optimum print exposure amount. The print exposure amount is corrected in accordance with light source type information and the like among the photographing information. Instead of the scanner 54 scanning and measuring each point within the frame while advancing the film, a stopped frame might be measured with an image area sensor.

The film carrier 55 sends the frame of the film 10 to be printed to the print station, in accordance with a detection signal from the perforation sensor 53. A light source 60, a filter adjusting unit 61, and a mixing box 62 are disposed under the film carrier 55. In accordance with the print exposure amount, the filter adjusting unit 61 adjusts the amount of color correction filters inserted into the optical path, so as to adjust the intensity of a print light and color balance. A zoom lens 63 and a shutter 64 are disposed above the film carrier 55. The zoom lens 63 projects an image in a frame to be printed onto the color paper 51.

The color paper 51 is wound in a roll and set to an exposure station by a paper feed roller pair 66. The exposed portion is transported to the processor 67 and developed. The developed film is cut into frames with a cutter 68, and ejected in a collector section 69.

After printing, the negative film 10 is stored in a loop by a film reservoir 56 between two pairs of film feed rollers 70 and 71. When a film end sensor 72 transmits a film end signal, the feed roller pair 71 stop rotating so that the negative film 10 sent from the print station is stored as the loop.

Next, the operation of the embodiment constructed as above will be described. After the cassette 11 is loaded on the cassette loading section 20, the controller 36 energizes the shifter 25 so that the spool rotating shaft 22 moves forward to couple to the spool 12. Next, the controller 36 causes the motor 24 to rotate so that the spool 12 is rotated by the spool rotating shaft 22 in the film advance direction. As the spool 12 rotates, the film leader 10a advances through the film passage slit 14. When the film end sensor 30 detects that the film leader 10a has passed through the film pulling roller pair 28, the shifter 25 is made inactive so that the spool rotating shaft 22 returns to the retracted position and the coupling to the spool 12 is released. Thereafter, the negative film 10 is pulled out farther from the cassette 11 by the film pulling roller pair 28.

When the film pulling roller pair 28 rotates for a predetermined time period after the film leader end is detected, the vertical position of the end of the film leader 10a is detected by the curl quantity measuring unit 27. The curl quantity measuring unit 27 detects the height of the end of the film leader 10a. This height has a certain relation with the curl quantity. Since the film leader 10a is positioned at the height of the optical path of the sensor 37, the output of the sensor 37 is decreased so that the controller 36 can detect the height of the end of the film leader 10a by checking the outputs from the sensor unit 31. After detecting the height of the film leader 10a end, the controller 36 causes the movable plate 34 to move from the retracted vertical position to the horizontal guide position so that the film leader 10a is advanced toward the film feed roller pair 41 of the curl straightening unit 40.

Next, the controller 36 refers to the look-up-table data stored in ROM 36a to convert the film end position signal into a curl straightening control quantity. In accordance with the curl straightening control quantity, the amount of heat supplied by the heating roller 42 and the feed speed of the film feed roller pair 44 are controlled to straighten the curl in accordance with the curl quantity. In this manner, the curl of the negative film 10 is straightened and the flatness of the negative film 10 can be ensured at the exposure station of the film carrier 55 by merely pushing the corners of the film 10. The negative film 10 with the curl straightened is stored by a predetermined amount by the film reservoir 43, and thereafter is transported to the printer 50.

At the printer 50, the read head 52a reads the photographing information, film information, and print instruction information, respectively recorded on the transparent magnetic recording layer of the negative film 10. The information is sent to the controller 36 which displays the information on the display 57 and calculates the print exposure amount in accordance with the light source type information and portrait information among the photographing information and the photometric values from the scanner 54. In accordance with the print instruction information, e.g., the pseudo zoom print information or trimming information, the controller 36 produces a pseudo zoom photoprint or trimming photoprint. While observing the information displayed on the display 57, an operator may proceed manually with the printing operation.

In accordance with the exposure amount, the filter adjustment unit 61 adjusts the intensity of a print light emanated from the light source and color balance. After this adjustment, the shutter 64 is opened for a predetermined time to project a frame image of the negative film 10 onto the color paper 51. The exposed color paper 51 is developed by the processor 67, cut into each frame, and ejected to the collector section 69. The printed negative film 10 is stored in loop by the film reservoir 56. When all frames are printed, the negative film 10 is moved in the reverse direction, and the spool 12 is rotated to rewind the negative film 10 within the cassette 13. In this case, a connecting tape is used, one end of which is fixed to the spool 12 and the other end of which is firmly attached to the trailer of the negative film, the connecting tape having a length corresponding to the distance between the cassette loading section 20 to the exposure station of the film carrier 55.

In the above embodiment, all frames are printed. In printing additional frames thereafter, it is common to specify some frames among all the frames of a negative film for printing. In such a case, additional frames to be printed are designated from a keyboard to sequentially set the designated frames at the print station. Although the negative film 10 after printing is rewound within the cassette 11, an empty cassette may be set at the outlet of the film carrier 55 to rewind the negative film 11 within the cassette 11, using a similar connecting tape described above. In such a case, it is preferable to use an arresting structure which allows the film trailer to be detached from the spool easily.

Furthermore, in the above embodiment, the heating roller 42 is used in the curl straightening unit 40. Alternatively, the curl inner surface of the negative film may have vapor applied thereto or the negative film 10 may be wound again so as to curl it in the opposite direction, so as to straighten the curl or reduce the curl quantity. A combination of a plurality of curl straightening apparatuses also may be used.

In the above embodiment, the curl quantity of the negative film 10 is detected along a print line for feeding the negative film 10 to the film carrier 55. Instead, the curl quantity measuring unit 27 may be mounted at another line different from the print line to the film carrier 55 to measure the curl quantity before the negative film is fed to the film carrier 55, only the curl straightening unit 40 being mounted at the print line to the film carrier 55. In such a case, the print process time does not contain the curl quantity measuring time, thereby reducing the print process time.

Still further, in the above embodiment, the height of the film leader end is measured to determine the curl quantity while nipping the negative film with the film pulling roller pair 28. Alternatively, the curl quantity may be measured at the initial film advancement when the film leader is pulled out of the cassette 13, without nipping it with the film pulling roller pair 28. The curl quantity may be measured on the basis of the deflection amount of the negative film at the center between two pairs of nipping rollers which loosely support the film.

Although the present invention has been fully described by way of the preferred embodiment thereof with reference to the accompanying drawings, various changes and modifications will be apparent to those of working skill in this field. Therefore, unless these changes and modifications depart from the scope of the present invention, they should be construed as included therein.

What is claimed is:

1. In a photographic printer in which a developed photographic film, coiled as a roll on a spool within a cassette, is pulled out of said cassette and transported to an exposure station for printing, apparatus for straightening said developed photographic film, said apparatus comprising:
   means for holding said cassette;
   means for measuring an amount of curl of said developed photographic film;
   means, disposed along a film passageway between said cassette holding means and said exposure station, for straightening a curl of said developed photographic film; and
   means for controlling an operation of said curl straightening means by providing a straightening quantity determined in accordance with said amount of curl.

2. Apparatus according to claim 1, wherein said controlling means comprises means for storing a relation between said amount of curl and said straightening quantity, said relation being obtained in advance through experiments.

3. Apparatus according to claim 2, wherein said curl straightening means comprises a heating roller.

4. Apparatus according to claim 3, wherein said controlling means comprises means for controlling a temperature and heating time of said heating roller in accordance with said straightening quantity.

5. Apparatus according to claim 4, wherein said amount of curl is a height of the end of a leader of said developed photographic film when a predetermined length of said film leader is held like a cantilever.

6. Apparatus according to claim 5, wherein said curl amount measuring means comprises a sensor unit having a plurality of photosensors disposed vertically.

7. Apparatus according to claim 1, further comprising a transport roller pair for nipping a leader of said developed photographic film and transporting said leader to said curl straightening means, said transport roller pair nipping said film leader advanced upon rotation of said spool within said cassette.

8. Apparatus according to claim 7, further comprising a movable guide plate for guiding said film leader through said transport roller pair, said movable guide plate being displaced between a retracted position where said movable guide plate is set for measuring said amount of curl and a guide position where said movable guide plate is set after measuring said amount of curl, said movable guide plate being substantially horizontal at said guide position to guide said film leader, and at said retracted position allowing said film leader to curl depending upon said amount of curl.

9. Apparatus according to claim 8, further comprising a leader sensor for detecting passage of said film leader through said transport roller pair.

10. Apparatus according to claim 9, wherein said curl amount measuring means comprises a sensor unit having a plurality of photosensors disposed vertically, said sensor unit measuring as said amount of curl a height of the end of said film leader when said transport roller pair rotates by a predetermined amount after said leader sensor generates a detection signal.

11. Apparatus according to claim 10, wherein said curl straightening means comprises a heating roller.

12. Apparatus according to claim 11, wherein said controlling means comprises means for controlling temperature and heating time of said heating roller in accordance with said amount of curl.

* * * * *